United States Patent [19]

Tagawa et al.

[11] Patent Number: 5,577,413

[45] Date of Patent: Nov. 26, 1996

[54] BICYCLE SPEED CHANGE OPERATION ASSEMBLY THAT PERMITS SPEED CHANGE OPERATION DURING BRAKING

[75] Inventors: Koichi Tagawa; Akira Nakatani; Toshimasa Yamazaki, all of Kawachinagano, Japan

[73] Assignee: Mory Suntour Inc., Osaka, Japan

[21] Appl. No.: 307,781

[22] PCT Filed: Feb. 10, 1994

[86] PCT No.: PCT/JP94/00207

§ 371 Date: Oct. 7, 1994

§ 102(e) Date: Oct. 7, 1994

[87] PCT Pub. No.: WO94/18061

PCT Pub. Date: Aug. 14, 1994

[30] Foreign Application Priority Data

Feb. 12, 1993 [JP] Japan ................................ 5-024546

[51] Int. Cl.$^6$ .................................................. B62M 25/04
[52] U.S. Cl. ................ 74/475; 74/489; 74/502.2
[58] Field of Search .................... 74/475, 489, 501.2

[56] References Cited

U.S. PATENT DOCUMENTS

| 3,180,166 | 4/1965 | Fox | 74/489 |
|---|---|---|---|
| 3,218,879 | 11/1965 | Reed | 74/489 |
| 3,633,437 | 1/1972 | Ishida | 74/489 |
| 4,352,303 | 10/1982 | Christner | 74/489 |
| 5,012,692 | 5/1991 | Nagano | 74/489 |
| 5,095,768 | 3/1992 | Nagano | 74/489 |
| 5,134,897 | 8/1992 | Romano | 74/489 |
| 5,241,877 | 9/1993 | Chen | 74/489 |
| 5,315,891 | 5/1994 | Tagawa | 74/489 |
| 5,429,012 | 7/1995 | Ikeda et al. | 74/475 |

FOREIGN PATENT DOCUMENTS

| A1571631 | 12/1993 | European Pat. Off. | B62M 25/04 |
|---|---|---|---|
| A1585474 | 3/1994 | European Pat. Off. | B62M 25/04 |
| 58-46693 | 3/1983 | Japan | B62M 25/04 |
| 58-191682 | 11/1983 | Japan | B62M 25/04 |
| 3-176290 | 7/1991 | Japan | B62M 25/04 |
| 4-260889 | 9/1992 | Japan | B62M 25/04 |
| 5-7594 | 2/1993 | Japan | B62M 25/04 |
| 9318961 | 9/1993 | WIPO | B62M 25/04 |

*Primary Examiner*—Charles A. Marmor
*Assistant Examiner*—David Fenstermacher
*Attorney, Agent, or Firm*—Michael D. Bednarek; Kilpatrick & Cody

[57] ABSTRACT

A bicycle speed change operation assembly wherein a speed change operation can be performed during a braking operation, and the speed change can be made in an optimum way in response to various running situations. The present invention provides a bicycle speed change operation assembly (6) comprising: a speed change operation member (14) supported for rotation about an axis of a handlebar (3); a cable winding member (107); a retaining mechanism (15) for holding the cable winding member at predetermined rotational positions; and a transmission mechanism (101) for transmitting rotational movement of the speed change operation member to the cable winding member; wherein the transmission mechanism includes: a transmission ring (103) connected to the cable winding member so as to be non-rotatable relative thereto, the transmission ring having an outer circumference formed with an engaging teeth portion; and an engaging pawl (110) held radially slidably between the speed change operation member and the transmission ring so as to displace radially inwardly for engagement with the engaging teeth portion in response to a rotational operation of the speed change operation member; wherein the cable winding member is rotated in either of cable pulling and cable paying out directions in response to a rotational reciprocation of the speed change operation member from a predetermined commencing point of rotation.

6 Claims, 15 Drawing Sheets

BICYCLE SPEED CHANGE OPERATION ASSEMBLY THAT PERMITS SPEED CHANGE OPERATION DURING BRAKING

FIELD OF THE INVENTION

The present invention relates to a bicycle speed change operation assembly, and more specifically to a bicycle speed change operation assembly wherein a speed change operation can be performed during a braking operation without deteriorating control stability.

BACKGROUND ART

A bicycle speed change assembly for sports type bicycles such as a racing bicycle is often mounted on a bicycle frame member such as the down tube or the top tube.

Therefore, the rider must unhand the handlebar to perform a speed change operation. As a result, it is impossible to immediately perform a braking operation during the speed change operation. In addition, the rider has to assume a single hand steering, which leads to unstable handlebar operation and poor safety.

The speed change operation is required mainly when road conditions change, for example, from a flat road to a slope, or vice versa. In such occasions the bicycle becomes unstable and the brake operation is often needed.

In an attempt to solve this problem the Japanese Utility Model Laid-open 58-46693, for example, discloses a speed change operation assembly, wherein a cylindrical operation member is fitted around each of the left and right grip portions of the handlebar, and these cylindrical operation members are rotated to pull or pay out respective speed control cables. This type of speed change operation assembly is commonly called a grip rotating type speed change operation assembly.

In this grip rotating type speed change operation assembly, it becomes possible to perform a speed change operation without unhanding the handlebar grip portion, resulting in remarkable improvement in riding safety.

In off-road riding on a mountain bike for example, it is sometimes necessary to perform a speed change operation at the same time with a braking operation.

In such a case, however, with the conventional grip rotating type speed change operation assembly, the cylindrical operation member must be rotated to a rotational position corresponding to a speed step. In particular, when the speed change operation is required through a plurality of speed steps, the amount of rotation required of the cylindrical operation member becomes large, and therefore, the hand and fingers must be re-positioned on the cylindrical operation member. Thus, it is very difficult to perform a speed change operation while operating the brake lever in the conventional handlebar rotating type speed change operation assembly.

In addition the speed change operation is performed in various ways in response to the changing running situation; sometimes the speed change operation is made all the way through several speed steps as mentioned earlier, or some other times the speed change operation is made in a stepped manner. It is too demanding to perform such different types of speed change operation smoothly using a cylindrical operation member disclosed in the above gazette.

DISCLOSURE OF THE INVENTION

It is therefore an object of the present invention to provide a bicycle speed change operation assembly wherein the speed change operation can be performed during a braking operation.

Another object of the present invention is to provide a bicycle speed change operation assembly wherein control stability is not disturbed during a speed change operation.

Further object of the present invention is to provide a bicycle speed change operation assembly wherein an optimum speed change operation can be made in response to different riding conditions. The present invention provides a bicycle speed change operation assembly comprising: a speed change operation member supported for rotation about an axis of a handlebar between a handlebar grip portion and a fixing member fitted around the handlebar; a cable winding member supported in the fixing member for rotation about the handlebar axis to wind or pay out a speed control cable; a retaining mechanism provided within the fixing member for holding the cable winding member at predetermined rotational positions; and a transmission mechanism provided between the speed change operation member and the cable winding member for transmitting rotational movement of the speed change operation member to the cable winding member; wherein the transmission mechanism includes: a transmission ring supported inward radially of the speed change operation member for rotation about the handlebar axis and connected to the cable winding member so as to be non-rotatable relative thereto, the transmission ring having an outer circumference formed with an engaging teeth portion; and an engaging pawl held radially slidably between the speed change operation member and the transmission ring so as to displace radially inwardly for engagement with the engaging teeth portion in response to a rotational operation of the speed change operation member in either of cable winding and cable paying out directions; wherein the cable winding member is rotated in either of the cable pulling and cable paying out directions in response to a rotational reciprocation of the speed change operation member from a predetermined commencing point of rotation.

Other objects, characteristics and advantages of the present invention will become clear from the preferred embodiments to be described later with reference to the attached figures.

BEST MODE FOR CARRYING OUT THE INVENTION

Now, the present invention will be described in more specific detail with reference to the attached drawings.

Figure 1:
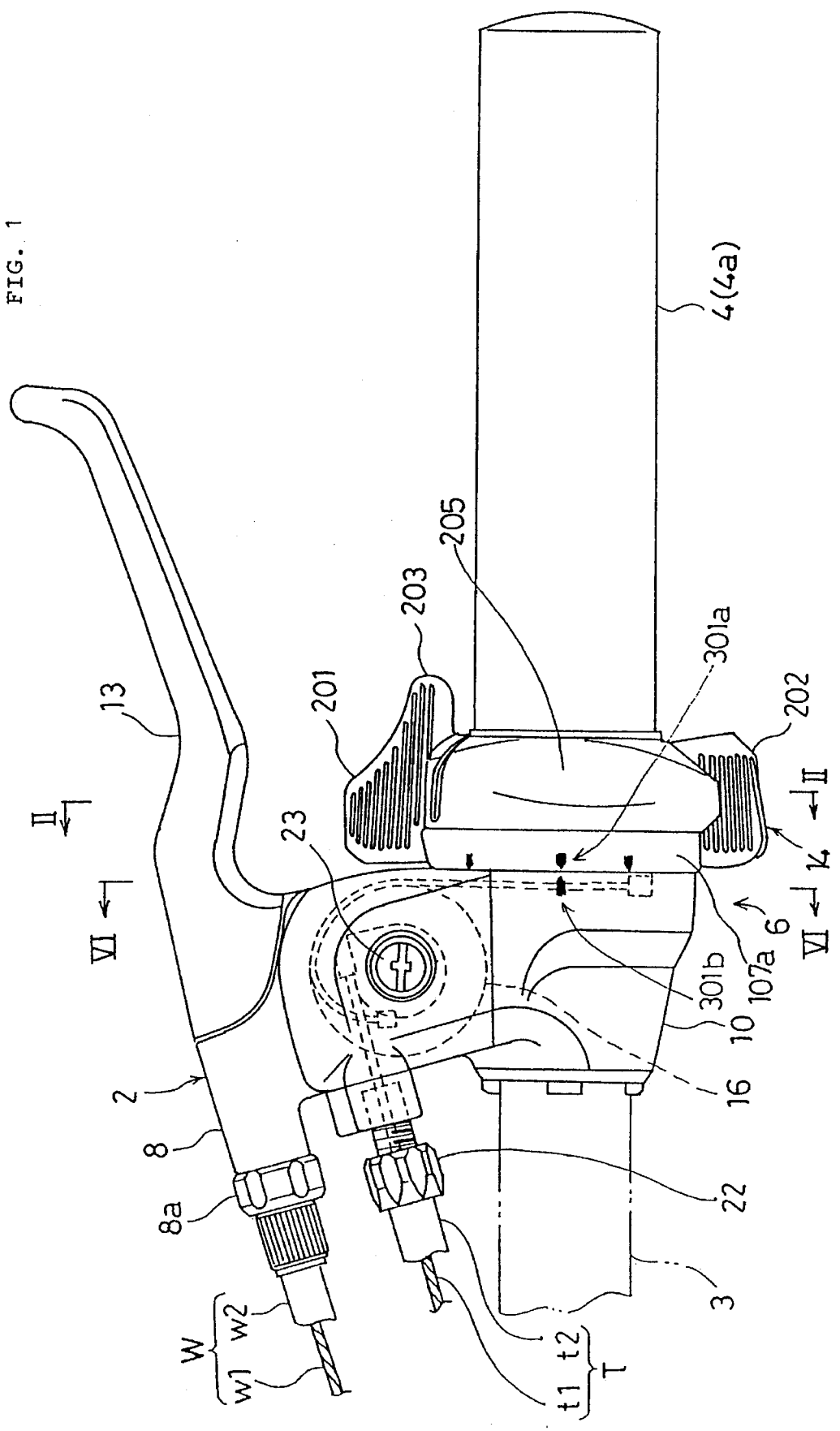
FIG. 1 is a plan view of an embodiment of a speed change operation assembly according to the present invention.

FIG. 1 shows an application of the present invention to a right speed change operation assembly 6 for activating an unillustrated rear speed shifter.

The speed change operation assembly 6 is provided inward axially of a right grip portion 4 of a handlebar 3 integrally with a brake lever assembly 2.

Figure 3:
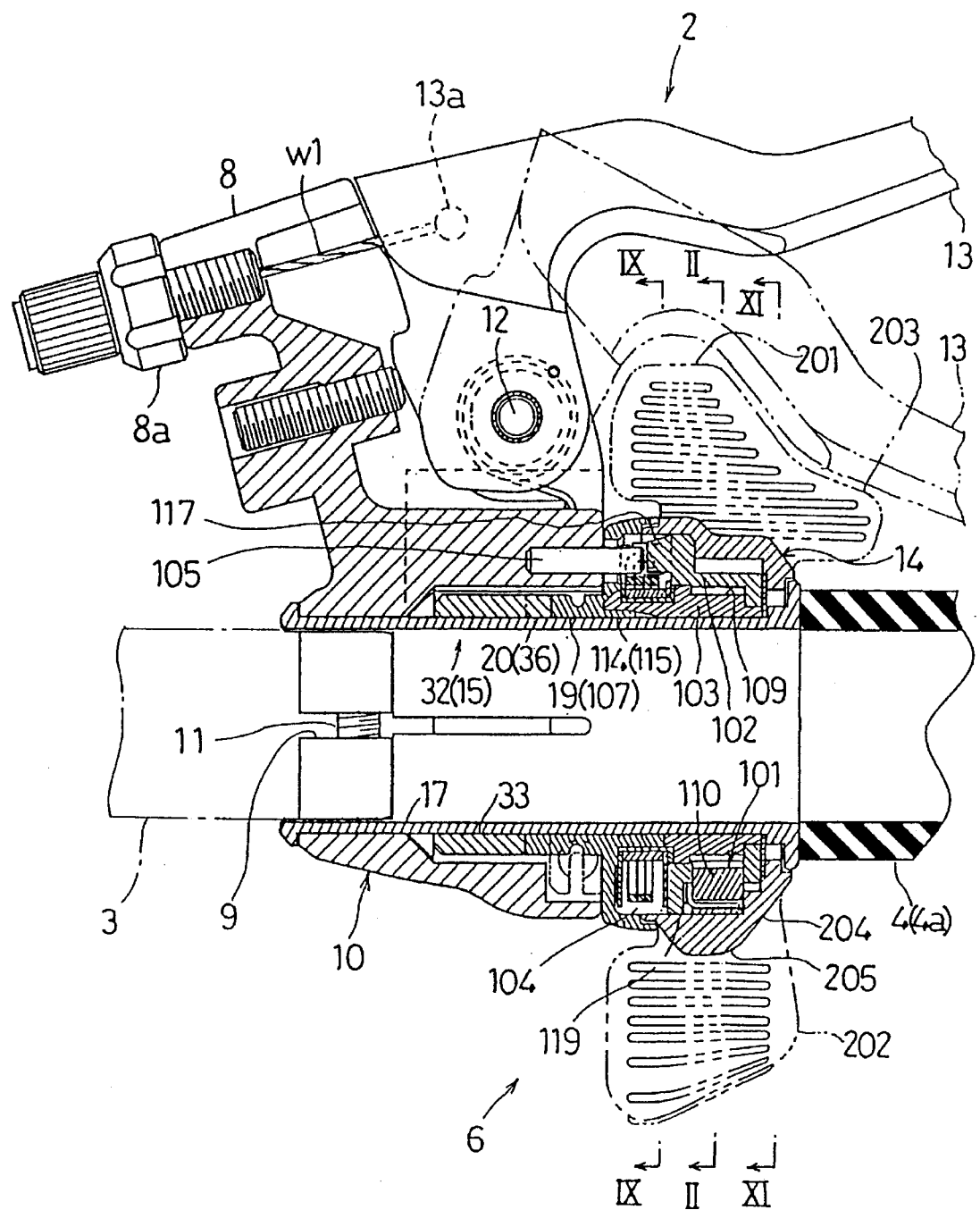
FIG. 3 is a sectional view taken along the line III-B-C-O-III of FIG. 2.

As shown in FIGS. 1 and 3 the brake lever assembly 2 includes a brake bracket 8 functioning as a fixing member, and a brake lever 13 supported pivotally by the brake bracket 8. The brake bracket 8 is projected forwardly of the bicycle from the handlebar 3. The brake lever 13 is pivotally connected at its base end portion around a lever shaft 12 provided in the brake bracket 8. The brake lever free end portion is extended ahead of the grip portion 4.

A brake cable W is connected to the brake lever assembly. The brake cable includes an inner wire w1 and an outer sheath w2. An end portion of the outer sheath w2 is fixed to a sheath catcher bolt 8a screwed to a laterally inward end portion of the brake bracket 8. The inner wire w1 is introduced into the brake bracket 8, and a nipple 13a provided at the end portion of the inner wire is fixed to the base end portion of the brake lever 13.

As shown in FIGS. 1 and 3 the brake bracket 8 is provided at its handlebar side with a cylindrical mount 10 having an axially cut-out slit 9. On the other hand, the outer wall portion of the handlebar 3 where the brake lever assembly 2 and the speed change operation assembly 6 are mounted is fitted with a cylindrical sleeve member 17 made of resin for rotatably supporting a cable winding member 107 and other members to be described later. The cylindrical mount 10 is fitted around an inward end portion of the resin sleeve member 17. A screw 11 traversing the slit 9 forcibly decreases the inner diameter of the cylindrical mount 10, thereby fastening the brake bracket 8 to the handlebar 3 together with the sleeve member 17.

The speed change operation assembly 6 includes an annular speed change operation member 14, a retaining mechanism 15, the cable winding member 107 and a cable winding reel 16.

The speed change operation member 14 is supported for rotation about an axis of the handlebar 3 between the brake bracket 8 and the grip portion 4. The outer circumference of the speed change operation member 14 extends more outward radially than the outer circumference of a rubber cover 4a fitted around the grip portion 4, and is provided with a first press operation portion 201 and a second press operation portion 202 each projecting radially outwardly at a predetermined angular interval from the other. The speed change operation member 14 is connected to the cable winding member 107 via a transmission mechanism 101 to be described later.

The cable winding member 107 is rotatably supported around the sleeve member 17, and is rotated in response to a rotating operation of the speed change operation member 14 for winding or paying out a drive cable K. The cable winding member 107 is provided at its axially outward end portion with an integrally formed connecting portion 115, and at its axially inward end portion with another integrally formed connecting portion 20. The connecting portion 115 is connected to the transmission mechanism 101. On the other hand the connecting portion 20 is connected to the retaining mechanism 15 for driving the retaining mechanism. A drive reel portion 19 is formed on an outer circumference between the two connecting portions 115 and 20 for winding or paying out the drive cable K relative to the cable winding reel 16.

An extended portion 107a is extended radially outward between the brake bracket 8 and the speed change operation member 14 from a circumference closer to the connecting portion 115 of the cable winding member 107. This extended portion encloses the returning mechanism 118 to be described later.

The cable winding member 107 is to be held by the retaining mechanism 15 at rotational positions corresponding to speed steps. As shown in FIG. 1 an outer face of the extended portion 107a and an outer circumferential edge of the cylindrical mount 10 are each provided with indicator markings 301a, 301b for displaying the speed steps.

The retaining mechanism 15 is provided within an annular space formed between an inner circumference of the cylindrical mount 10 of the brake bracket 8 and an outer circumference of the handlebar 3. In the present embodiment a click mechanism 32 is used as the retaining mechanism 15 so that the cable winding member 107 can be held stepwise.

Figure 7:
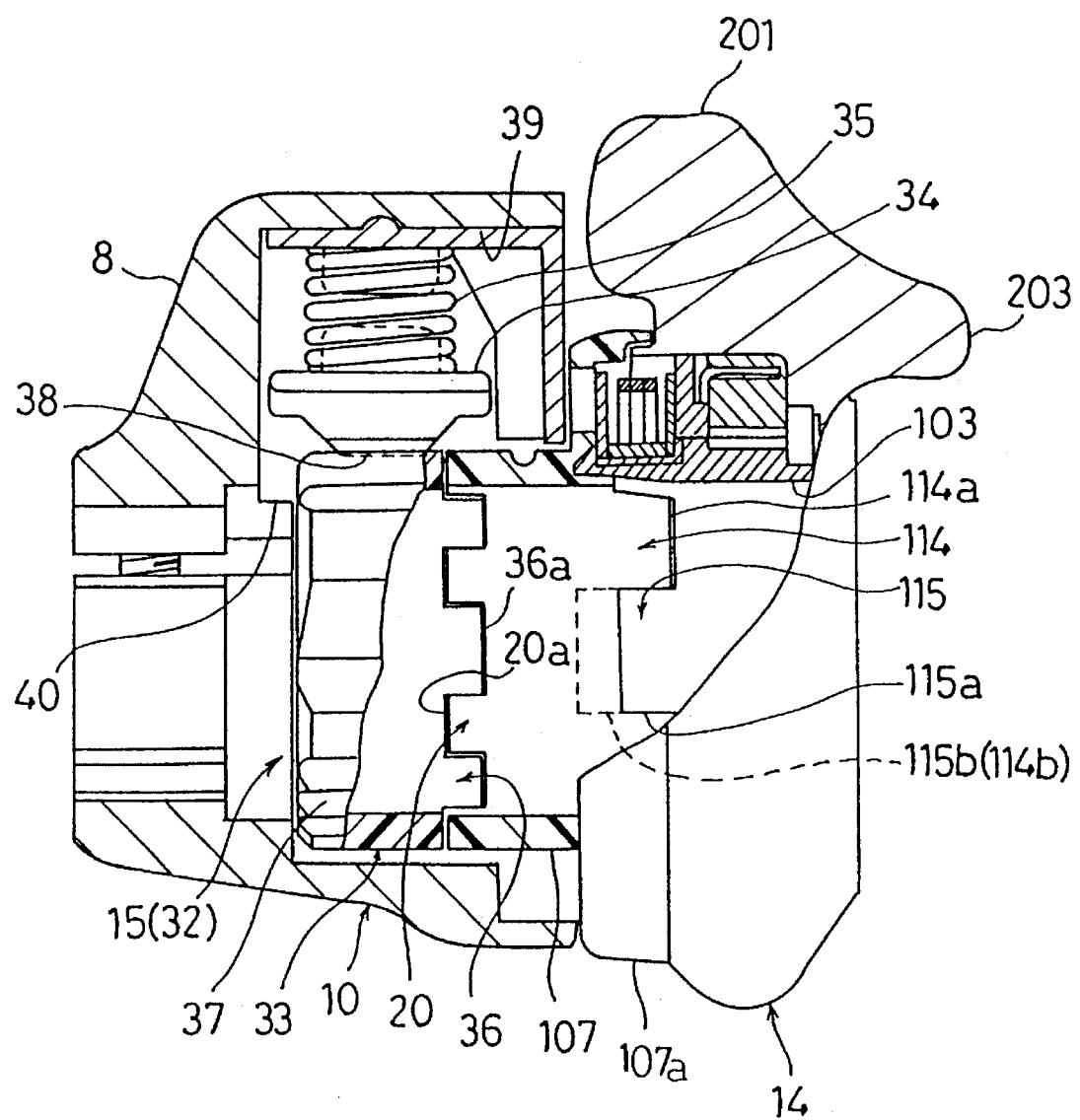
FIG. 7 is a sectional view taken along the line VII—VII in FIG. 6.

As shown in FIG. 7 the click mechanism 32 generally includes a click ring 33 located inward axially of the cable winding member 107 for integral rotation with the cable winding member 107, an engaging member 34 elastically contacted to the outer circumference of the click ring 33, and a coil spring 35 elastically urging the engaging member 34.

The click ring 33, formed generally cylindrically, is rotatably supported around the sleeve member 17 inside the cylindrical mount 10.

The click ring 33 is formed at its axially outward end portion with a connecting portion 36 for engagement with the connecting portion 20 formed at an inward end portion of the cable winding member 107.

As shown in FIG. 7 the connecting portion 36 is formed with a plurality of connecting teeth 36a. These connecting teeth 36a engage with a plurality of connecting teeth 20a formed in the connecting portion 20 for rotating the click ring 33 and the cable winding member 107 integrally with each other.

The click ring 33 is formed with a plurality of axially parallel engaging recesses 37 around its outer circumference. Hence, successive elastic engagement of a pawl portion 38 of the engaging member 34 with the engaging recess 37 holds the cable winding member 107 stepwise at the predetermined rotational positions via the click ring 33.

As shown in FIG. 7 the engaging member 34 is housed with the coil spring 35 in a housing hole 39 provided at the base end portion of the brake bracket 8. The housing hole 39 is formed with an opening 40 communicating with the inner circumference of the cylindrical mount 10 of the brake bracket 8. The pawl portion 38 of the engaging member 34 is projected through this opening 40, thereby contacted to the outer circumference of the click ring 33.

Since the click mechanism 32 is provided entirely within the base end portion of the brake bracket 8, the size of the speed change operation assembly 6 can be very compact.

A speed control cable T according to the present embodiment includes an inner wire t1 and a surrounding outer sheath t2. An end of the control cable is connected to the unillustrated speed shifter whereas the other end is connected to the speed change operation assembly 6. The speed control cable T is laid along the handlebar 3. An end of the outer sheath t2 is fixed to a sheath catcher 22 bolted at an inward side of the base end portion of brake bracket 8. The inner wire t1 extending out of the end of outer sheath t2 in the brake bracket 8 is wound around the cable winding reel 16.

Figure 6:
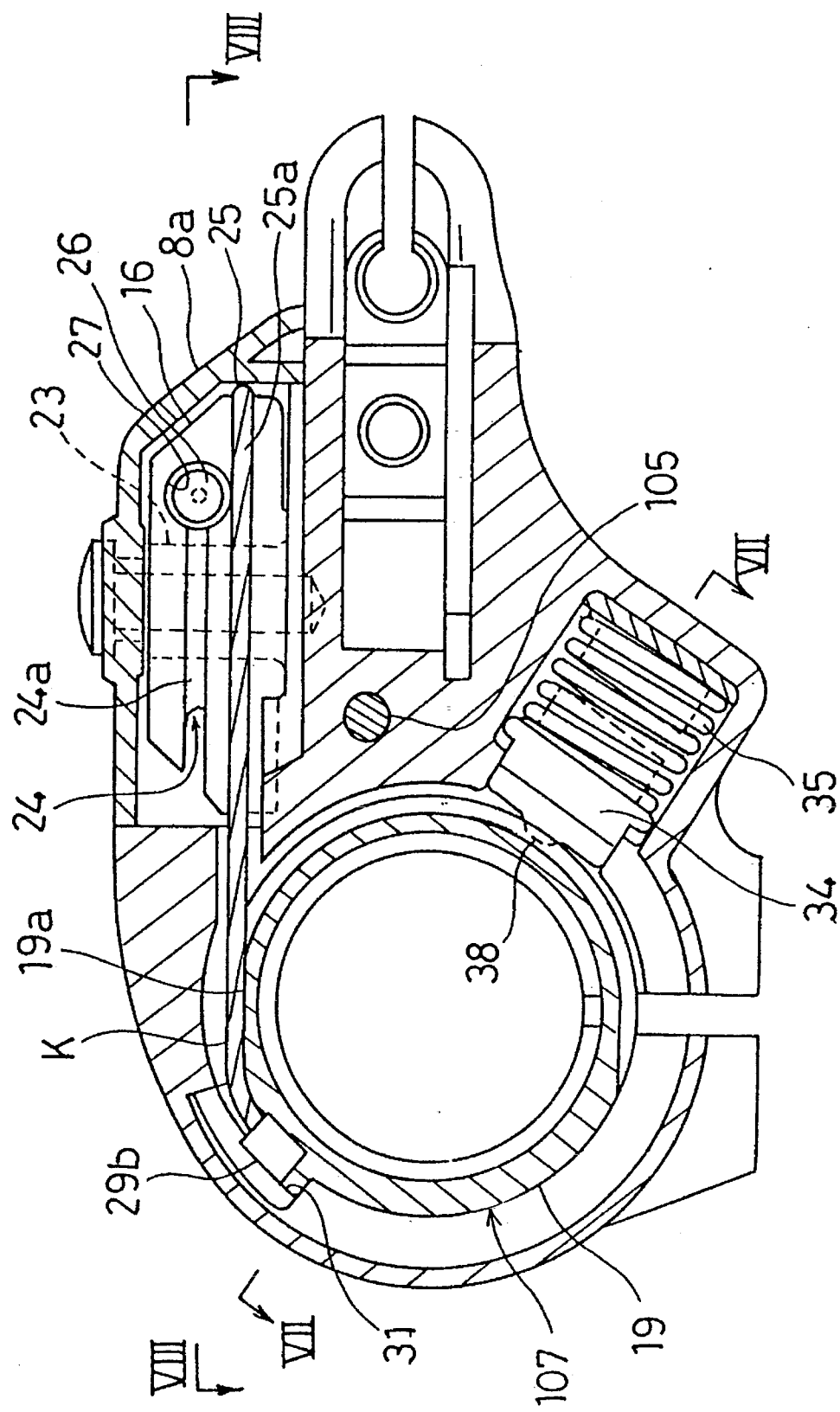
FIG. 6 is a sectional view taken along the line VI—VI in FIG. 1.
Figure 8:
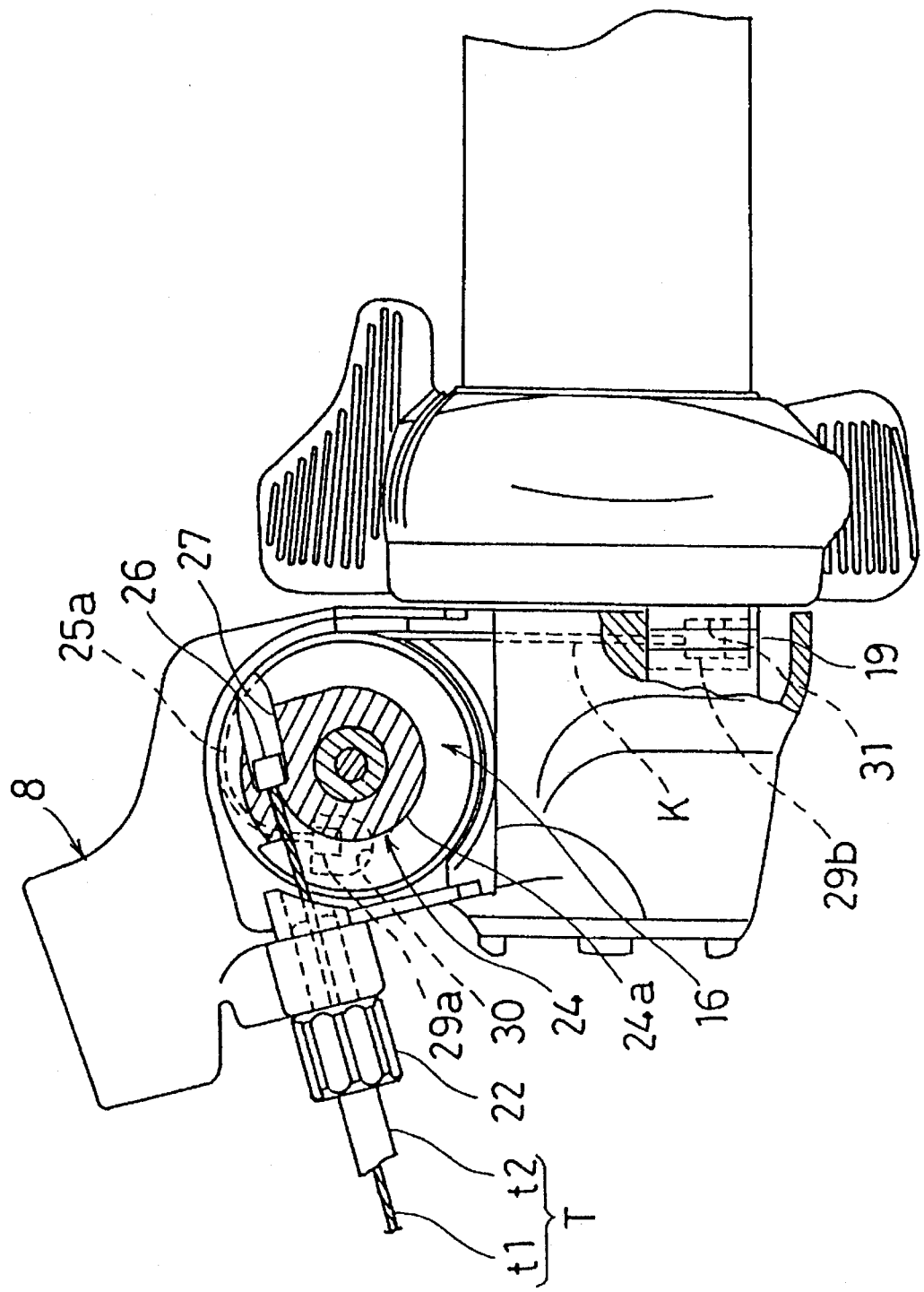
FIG. 8 is a sectional view taken along the line VIII—VIII in FIG. 6.
Figure 9:
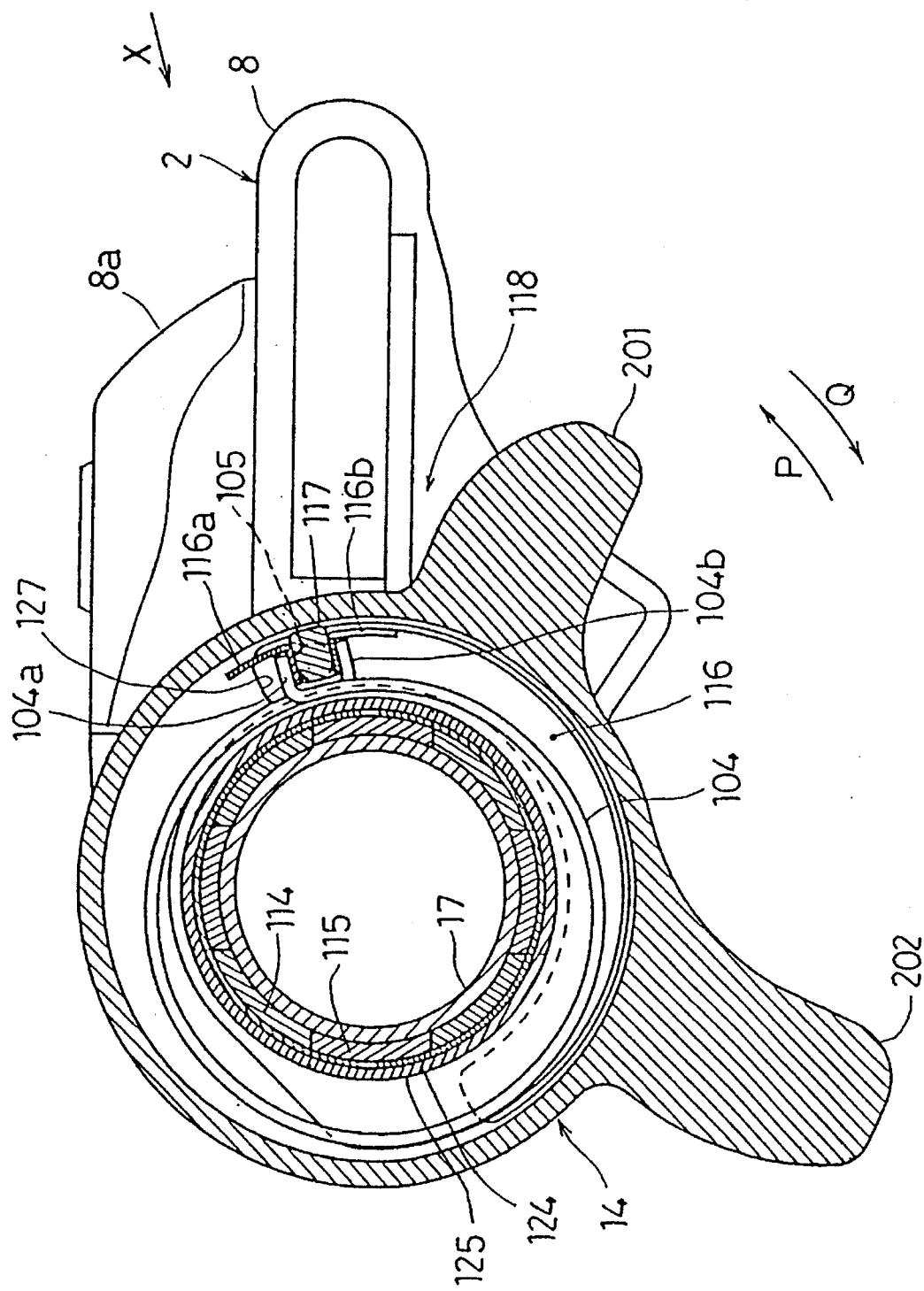
FIG. 9 is a sectional view taken along the line IX—IX in FIG. 3.

As shown in FIGS. 6 and 8 the cable winding reel 16 is generally shaped in a circular frustum, and is rotatably supported around a shaft 23 provided on a top face of the brake bracket 8. A member given the alpha-numeric code 8a is a cover enclosing the cable winding reel 16.

The cable winding reel 16 is formed around its outer circumference with a first reel portion 24 for winding the inner wire t1, and a second reel portion 25 for winding the drive cable K extending from the drive reel portion 19 of the cable winding member 107.

The first reel portion 24 is formed at a diametrically smaller side of the cable winding reel 16, including a cable winding groove 24a formed by cutting the slope of the frustum inward radially, and a nipple catcher hole 27 formed tangentially continuously from the cable winding groove 24a. The inner wire t1 is wound around the cable winding groove 24a, and an end nipple 26 is fixed to the nipple catcher hole 27.

On the other hand the second reel portion 25 is formed at a diametrically larger side of the cable winding reel 16 closer to the top face of the brake bracket 8, and a cable winding groove 25a is formed substantially along the outermost diameter of the cable winding reel 16. An end portion of the cable winding groove 25a is curved radially inwardly, and the end is formed with a nipple catcher hole 30 continuous from the cable winding groove 25a.

The drive reel K is extended from the drive reel portion 19 of the cable winding member 107 vertically to the handlebar 3. The drive cable K is then wound around the cable winding groove 25a of the second reel portion 25. An end nipple 29a provided at an end portion of the drive cable is fixed to a nipple catcher hole 30, thereby connecting the drive cable K to the cable winding reel 16.

On the other hand the other end portion of the drive cable K is wound around the reel winding groove 19a of the drive reel portion 19 of the cable winding member 107. A nipple 29b provided at the end portion is housed in a nipple catcher hole 31 provided along a cable winding groove 19a.

The inner wire t1 and the drive cable K are wound or paid out substantially vertically to each other. Thus, when the drive cable K is wound circumferentially of the cable winding member 107, the speed control cable t1 is pulled or paid out along the handlebar 3.

As shown in FIG. 7 the cable winding member 107 and the transmission ring 103 as a constituent member of the transmission mechanism 101 to be described later are rotated integrally with each other since their respective connecting portions 114a and 115a engage with each other.

Thus, when the speed change operation member 14 is rotated, the transmission mechanism 101 drives the cable winding member 107 or the retaining mechanism 15.

The speed change operation member 14 is connected to the cable winding member 107 via the transmission mechanism 107. When the speed change operation member 14 is rotatively reciprocated from a predetermined commencing point of rotation, the cable winding member 107 is rotated in the cable winding direction or cable paying out direction.

As shown in FIGS. 2 through 5 the transmission mechanism 101 generally includes a pawl holding member 102, the transmission ring 103, a pair of engaging pawls 110, and a returning mechanism 118.

Figure 2:
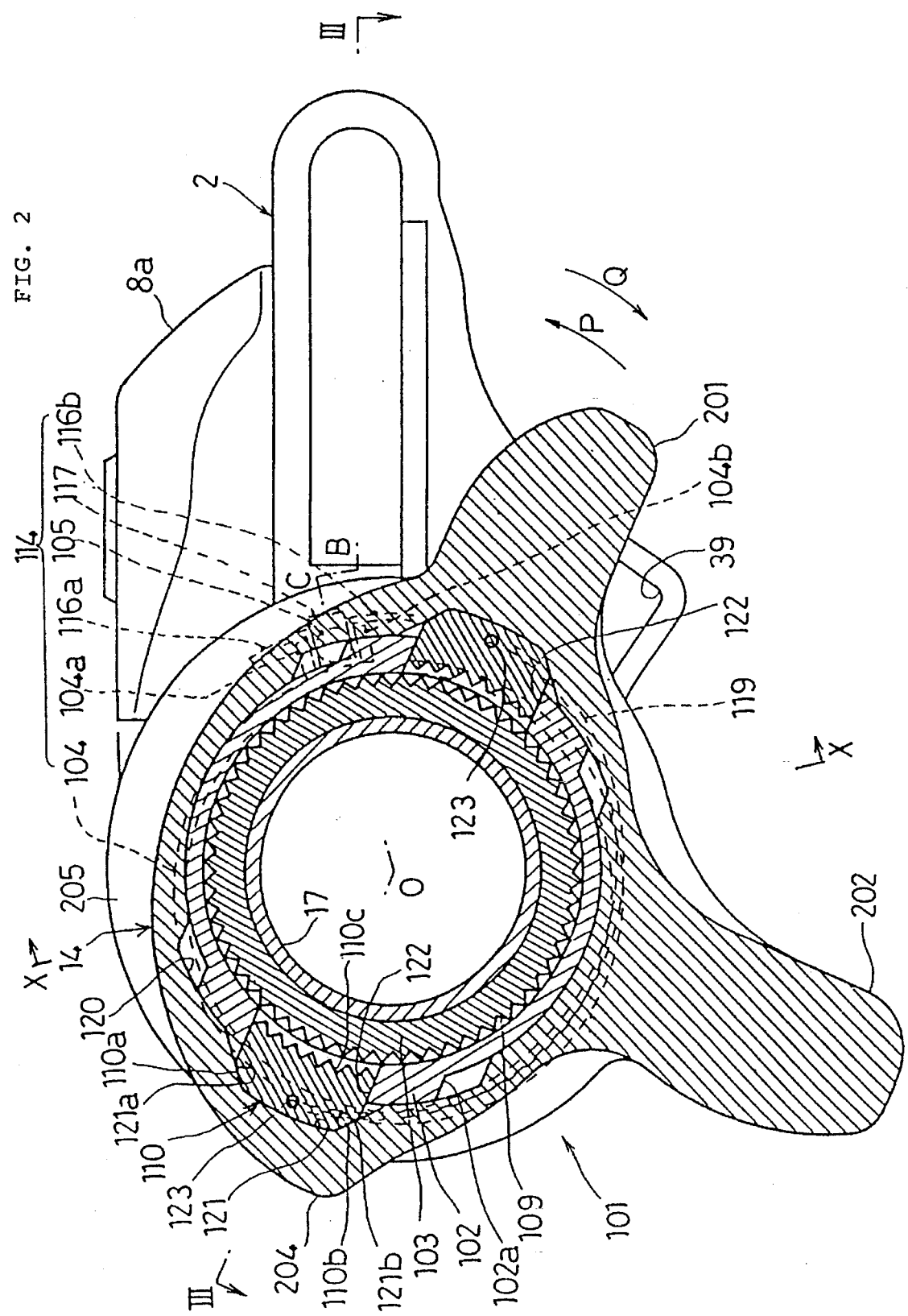
FIG. 2 is a sectional view taken along the Line II—II of FIG. 1.
Figure 5:
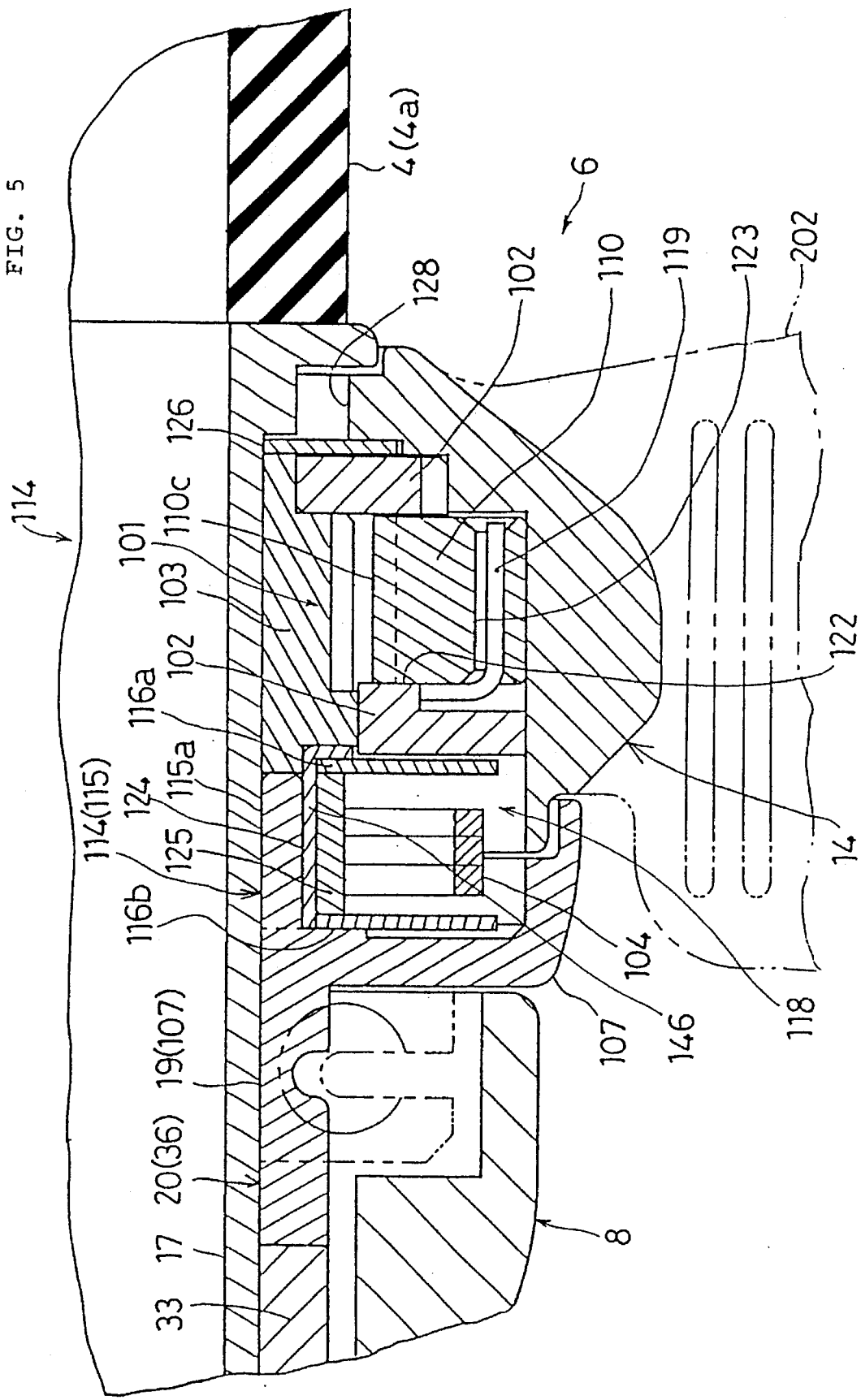
FIG. 5 is an enlarged view of a primary portion of FIG. 3.

The pawl holding member 102 is fitted inward radially of the speed change operation member 14 for rotation about an axis of the handlebar 3. As shown in FIGS. 2 and 5 the pawl holding member 102 is formed with a diametrically opposed pair of pawl holding holes 122. Each pawl holding hole 122 holds an engaging pawl 110 radially slidably. The pawl holing member 102 is fitted to the speed change operation member 14 for predetermined relative rotation thereto.

As shown in FIG. 2 the pawl holding member 102 is formed with a pawl holding portion 102a extending radially outwardly, and having the pawl holding hole 122. The speed change operation member 14 is formed in its inner circumference with a control recess 120 for housing the pawl holding portion 102a. A generally trapeziform pawl pressing portion 121 is provided outward radially of the control recess 120. This pawl pressing portion 121 includes a pair of slant faces 121a, 121b corresponding to a pair of slant faces 110a, 110b formed radially outwardly on respective sides of the engaging pawl 110.

The transmission ring 103 is rotatably fitted around the sleeve member 17 inward radially of the pawl holding member 102. The transmission ring 103 is formed on its outer circumference with an engaging teeth portion 109.

Thus, when the speed change operation member 14 is rotated from a predetermined neutral position, the slant faces 121a, 121b of the pawl pressing portion 121 press the slant faces 110a, 110b of the engaging pawls 110, sliding the engaging pawl 110 radially inwardly. This brings the engaging pawl 110 into engagement with the engaging teeth portion 109, rotating the transmission ring 103 integrally with the speed change operation member 14 in the selected direction. Since the present embodiment uses a pair of engaging pawls 110 sandwiching the engaging teeth portion 109, the engaging pawls 110 can engage with the engaging teeth portion 109 quite assuredly, thereby efficiently rotating the pawl holding member 102 and the transmission ring 103.

The engaging pawl 110 is formed with spring catcher holes 123 formed generally parallel to an axis of the handlebar 3. The spring catcher holes 123 hold respective end portions of a semi-circular spring 119 which elastically urges the engaging pawl 110 radially outwardly for disengaging a pawl portion 110c of the engaging pawl 110 from the engaging teeth portion 109 of the transmission ring 103 when the speed change operation member 14 is at the neutral position of rotation. This spring 119 is provided only to facilitate the engaging pawl 110 to disengage from the engaging teeth portion 109, so the provision of the spring may be eliminated.

Figure 4:
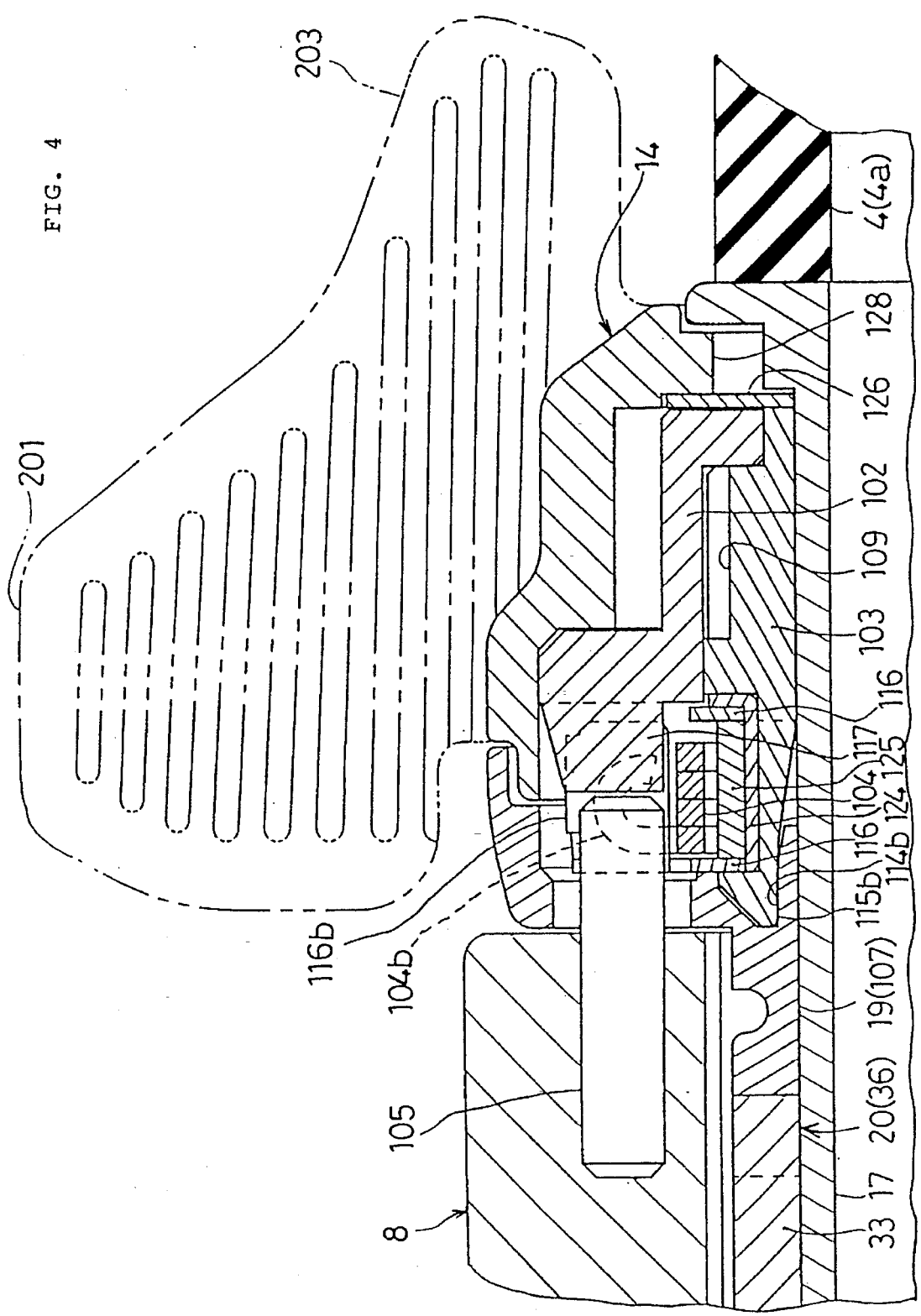
FIG. 4 is an enlarged view of a primary portion of FIG. 3.
Figure 10:
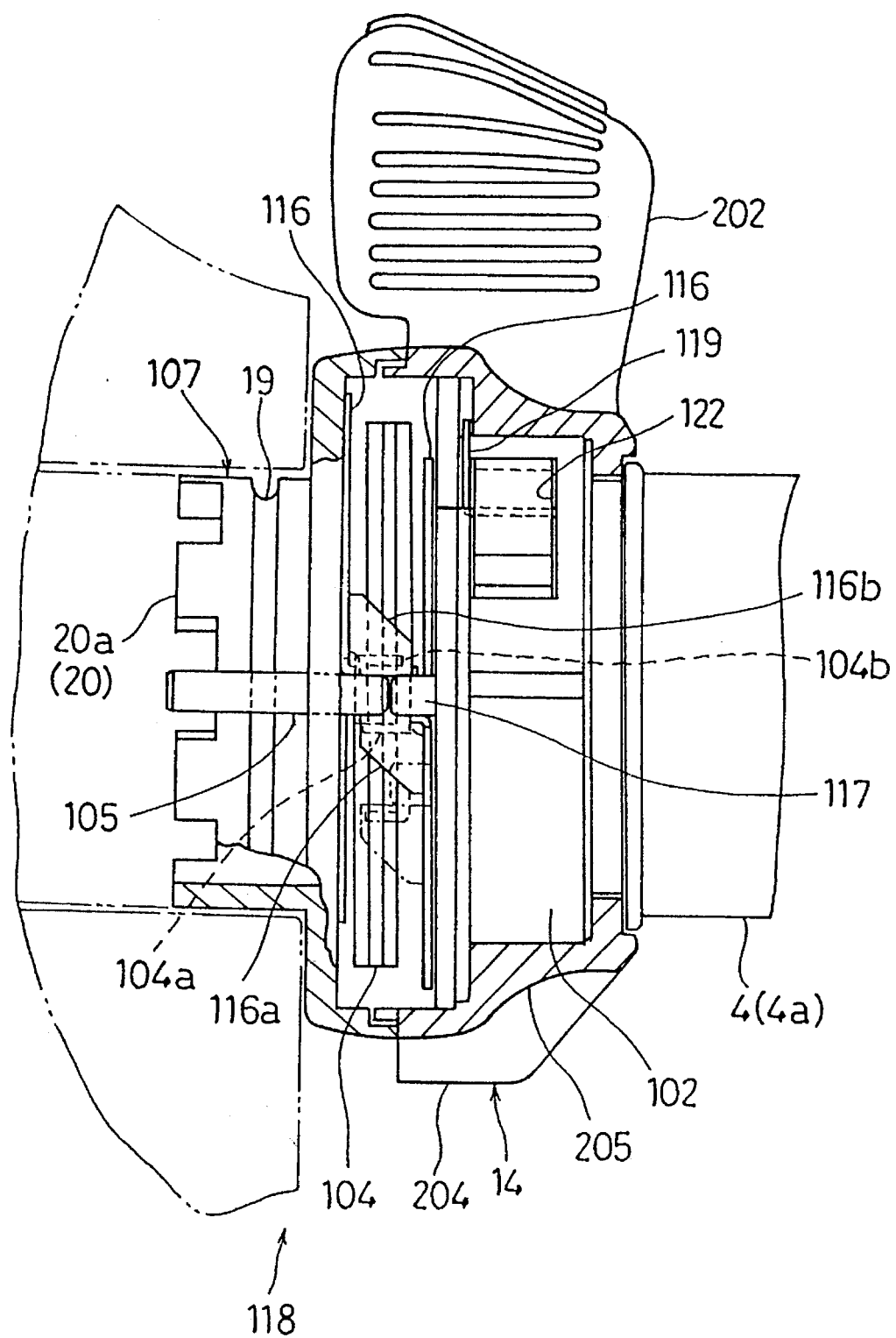
FIG. 10 is a view showing a partial cross-section taken along the line x—x in FIG. 2 for depicting a return mechanism.

As shown in FIGS. 4, 5 and 10 the returning mechanism 118 generally includes a spring catcher portion 117, a catcher pin 105, a return spring 104, and spring catchers 116.

The spring catcher portion 117 extends axially from an inward end face of the transmission ring 103. The catcher pin 105 is embedded in the base end portion of the brake bracket 8, and extended toward the spring catcher portion 117. The return spring 104 is fitted around a spring holding recess 146 provided in the outer circumference of the transmission ring 103. End portions of the return spring are respectively engaged with the spring catcher pin 105 and the spring catcher portion 117 for elastically urging the transmission ring 102 to the neutral position.

The returning mechanism 118 is provided in the outer circumference of the connecting portion 115 of the transmission ring. As shown in FIG. 4, in order to protect the connecting teeth 115a from deformation by outside force from the return spring 104 and other members, a tip portion 115b of the connecting teeth 115a is inserted into a connecting hole 114b formed at a base end portion of the connecting teeth 114a located at the cable winding member side.

The spring catchers 116, 117 are rotatably fitted around respective sides of the spring holding recess 146 so as to flank the return spring 104, holding the ends of the return spring 104 as well as elastically urging the spring catcher pin 105 and the spring catcher portion 117.

As shown in FIG. 10 the spring catchers 116 are formed on their respective outer circumference with axially extending spring catcher portions 116a, 116b. Thus, respective end portions of the return spring 104 can be retained at the spring catcher portions 116a, 116b while flanking and engaging with the spring catcher pin 105. In addition, The spring catcher portions 116a, 116b are extended to flank the spring catcher portion 117. Thus, when the pawl holding member 102 is rotated to move the spring catcher portion 117 circumferentially, the spring catcher portions 116a, 116b of the spring catcher 116 move the end portions of the return spring 104 for elastically urging the spring holding member 102 to the neutral position, that is, the position where the spring catcher pin 105 opposes the spring catcher portion 117.

Provision of the spring catchers 116 makes possible to position the spring catcher pin 105 and the spring catcher portion 117 at the same radial distance, thereby reducing the radial size of the assembly. Further, provision of the pair of spring catcher portions 116a, 116b makes possible to prepare the returning mechanism 118 as a separate unit to be mounted around the transmission ring 103, making the assembly process very easy.

As shown in FIG. 2 the two end portions 104a, 104b of the return spring 104 is held on the spring catcher pin 105 while contacting to flank the spring catcher portion 117. At the same time, a radially outward portion of the engaging pawl 110 fits into the pawl pressing portion 121 of the speed change operation member 14. Thus, the engaging pawl 110 is held apart from the engaging teeth portion 109 of the transmission ring 103 when the speed change operation member 14 is at its neutral position of rotation.

Now, description will be made on the function of the speed change operation assembly 6 referring to FIGS. 2, 12 through 15.

Figure 12:
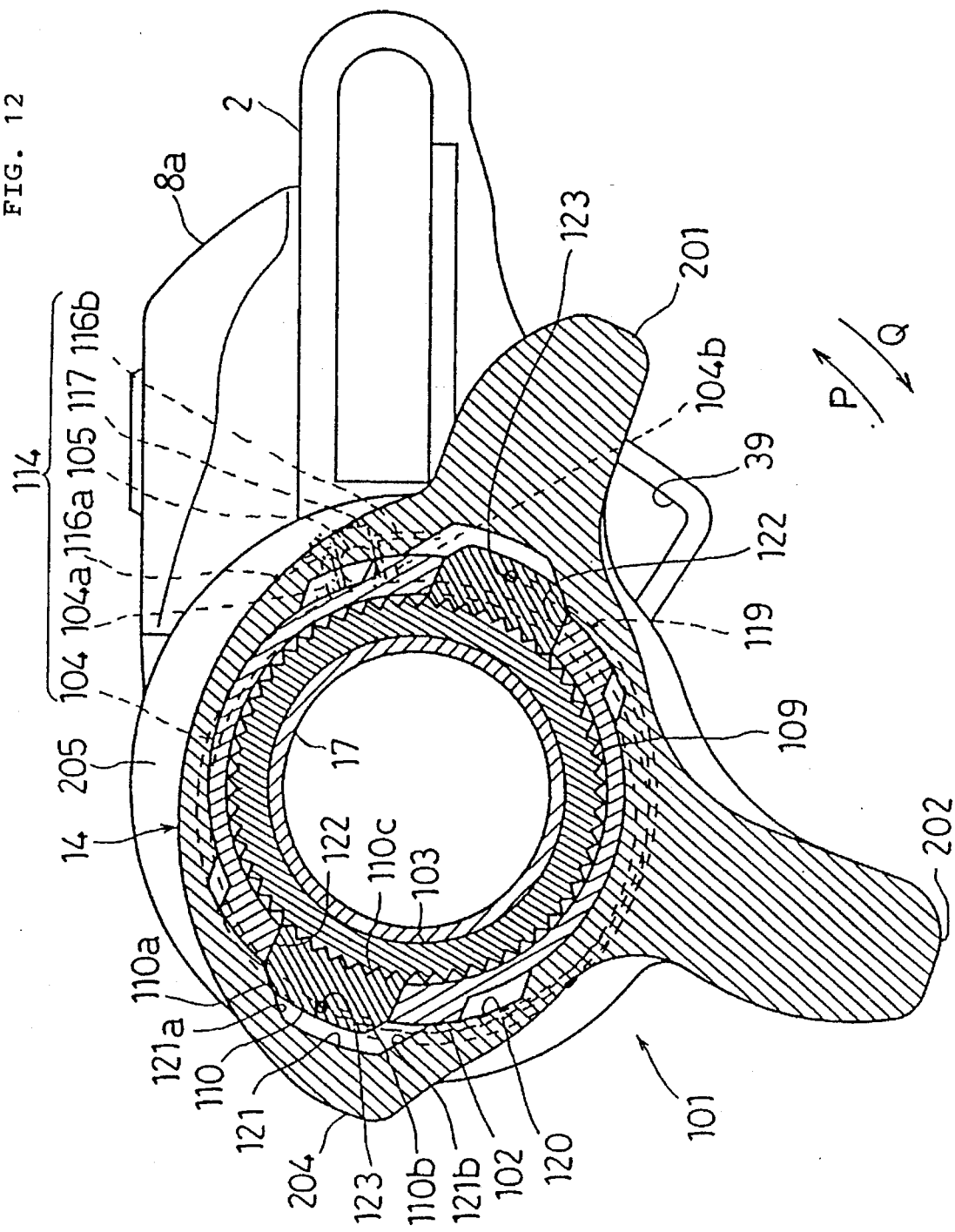
FIG. 12 is a view corresponding to FIG. 2 for depicting function of the embodiment.

Starting from the sate shown in FIG. 2, when the speed change operation member 104 is rotated in the counterclockwise direction (Arrow P,) the clockwise slant face 110a of the engaging pawl 110 is pressed by the clockwise slant face 121a of the pawl pressing portion 121, as shown in FIG. 12, moving the engaging pawl 110 radially inwardly. The pawl portion 110c of the engaging pawl 110 is then engaged with the engaging teeth portion 109 of the transmission ring 103.

Figure 13:
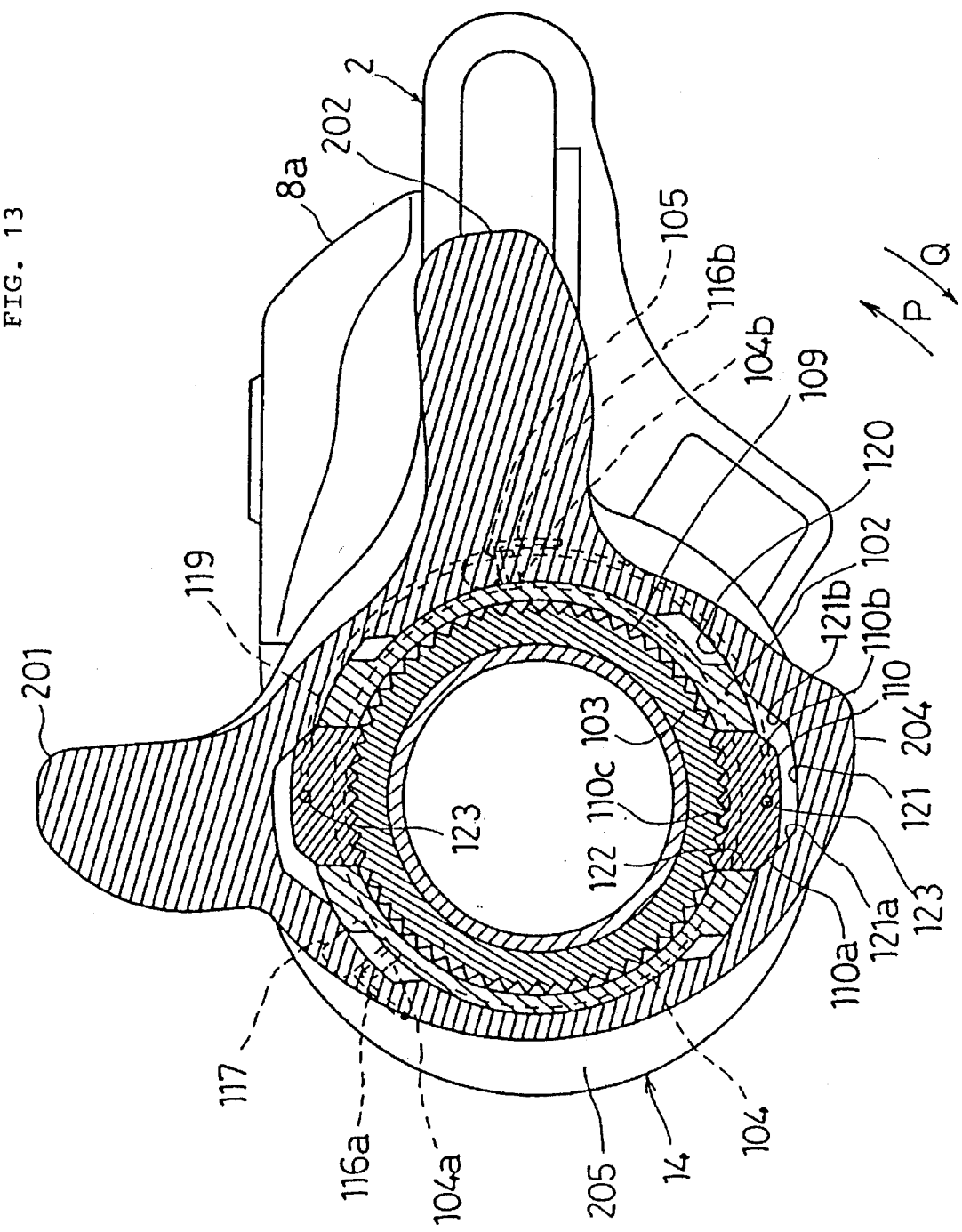
FIG. 13 is a view corresponding to FIG. 2 for depicting function of the embodiment.

Now, when the speed change operation member 14 is further rotated in the counterclockwise direction (Arrow P) as shown in FIG. 13, the engaging pawl 110 remains engaged, and the cable winding member 107 is rotated in the cable winding direction, performing a speed change operation.

Figure 11:
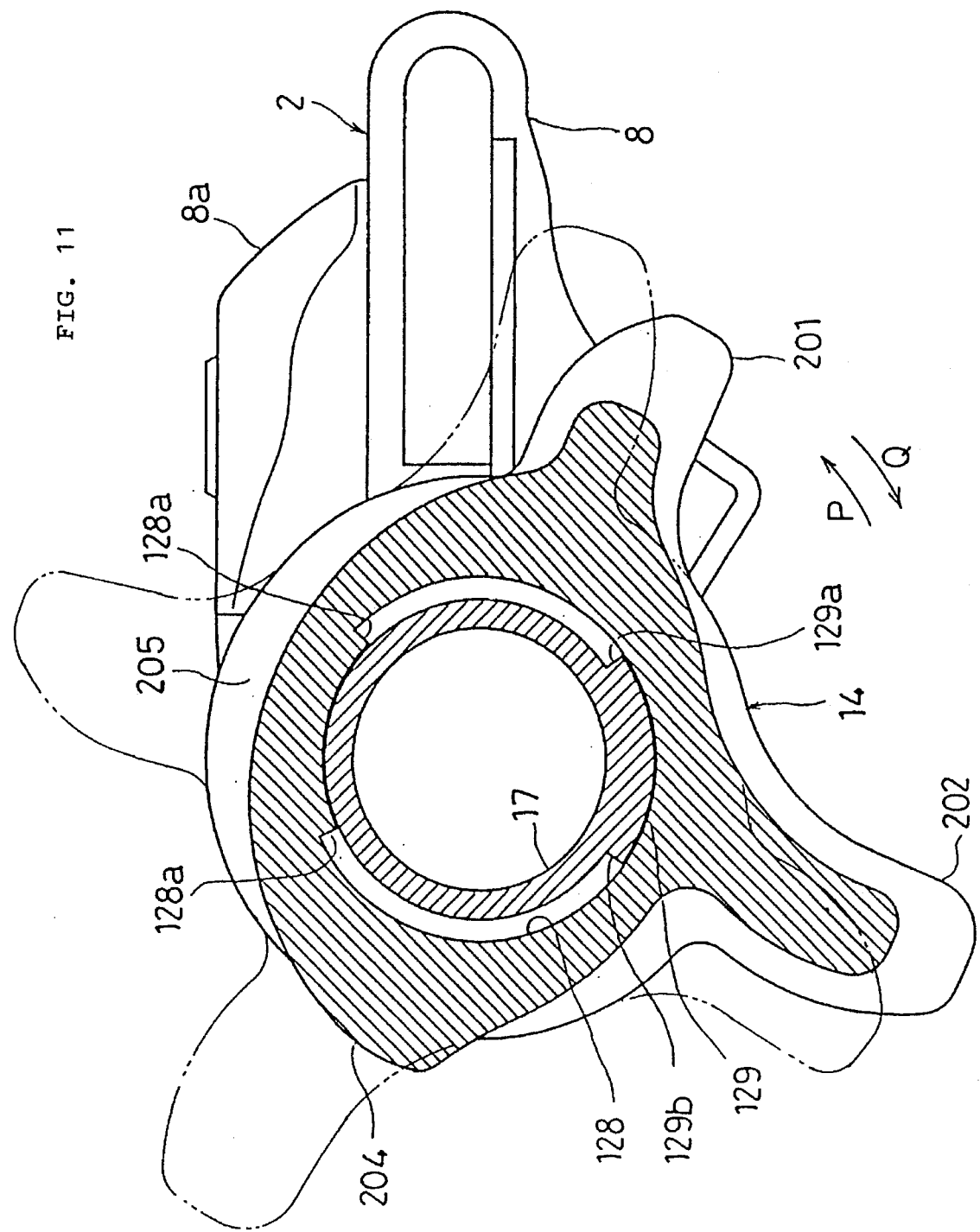
FIG. 11 is a sectional view taken along the line XI—XI in FIG. 3.

As shown in FIG. 11 the speed change operation member 14 is provided in its axially outward inner circumference with an annular recess for housing a control bulge 129 formed on the outer circumference of the sleeve member 17. Thus, the speed change operation member 14 and the pawl holding member 102 can only rotate within a predetermined range.

Now, when the force applied for rotating the speed change operation member 14 is released, the pawl holding member 102 is returned clockwise by the return spring 104. At the same time the engaging pawl 110 is moved radially outwardly by the elastic urge of the spring 119, being disengaged from the engaging teeth portion 109. Thus, the pawl holding member 102 and the speed change operation member 14 is rotated back to the neutral position shown in FIG. 2.

Figure 14:
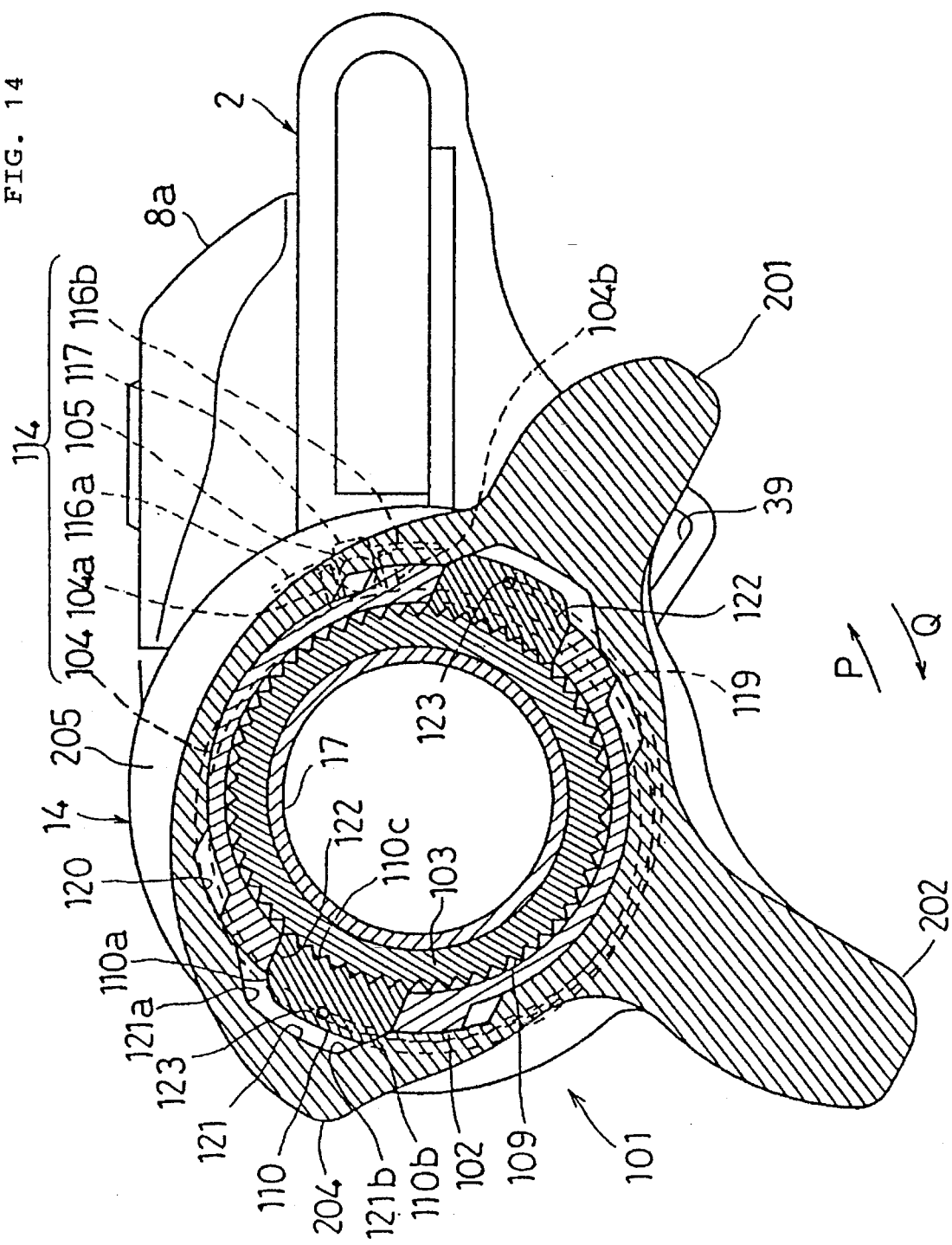
FIG. 14 is a view corresponding to FIG. 2 for depicting function of the embodiment.
Figure 15:
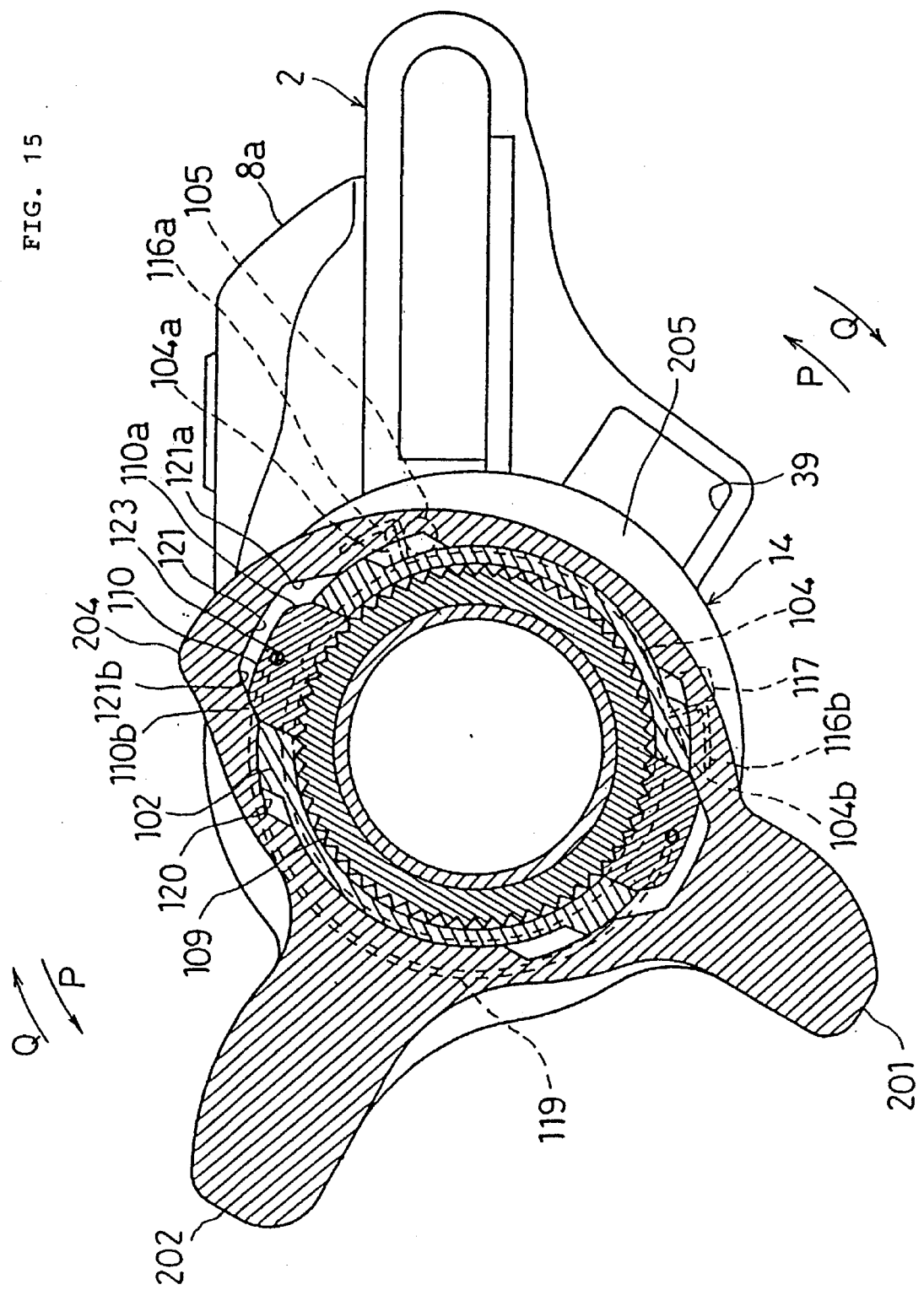
FIG. 15 is a view corresponding to FIG. 2 for depicting function of the embodiment.

On the other hand, when the speed change operation member 14 is rotated in the clockwise direction (Arrow Q) from the neutral state shown in FIG. 2, the counterclockwise slant face 121b of the pawl pressing portion 121 presses the counterclockwise slant face 110b of the engaging pawl 110 as shown in FIGS. 13 and 14, moving the engaging pawl 110 radially inwardly. The engaging pawl 110 is then engaged with the engaging teeth portion 119. When the speed change operation member 14 is further rotated in the clockwise direction, the pawl holding member 102 or the cable winding member is rotated in the cable paying out direction as shown in FIG. 15, and a speed change is performed.

Likewise, when the force applied for rotating the speed change operation member 14 is released, the pawl holding member 102 and the speed change operation member 14 are moved back by the return spring 104 to the neutral position shown in FIG. 2.

The cable winding member 107 is held stepwise by the retaining mechanism 15. Thus, the speed change operation cable K is not paid out unnecessarily by the pulling force of a return spring mounted in the speed shifter.

In the speed change operation assembly 6 of the above-described arrangement, it is possible to wind or pay out the speed control cable by rotatively reciprocating the speed change operation member 14 in one direction from its neutral position of rotation. Thus, it becomes possible to pull or pay out an amount of control cable necessary for a speed change operation while maintaining the reciprocating movement per stroke at a small amount.

Further, when a greater amount of cable must be pulled for a speed change, it is not necessary to change the grip position on the speed change operation member 14. Thus, significant improvement in speed change operability and braking operability during a speed change operation is achieved, resulting in substantially improved riding safety.

Further, it becomes possible to arrange the speed change operation member, the handlebar grip portion and the brake lever assembly closely enough from the rider's hand. Therefore, it becomes possible to perform a speed change operation and braking operation simultaneously with fingers virtually held engaged with the grip portion 4. This significantly improves the riding safety, making possible to assuredly perform a speed change operation and braking operation in response to different riding conditions.

In addition, the speed change operation assembly 14 is provided on its outer circumference with the first press operation portion 201 and the second press operation portion 202 each extending radially outwardly at a predetermined angular interval from the other.

The first press operation assembly 201 and the second speed change operation assembly 202 are formed to have a certain predetermined angular interval from the other so that the press operation portions 201, 202 are fitted respectively by the forefinger and thumb of the rider.

Thus, the rider can operate the speed change operation assembly while gripping the handlebar with his middle finger and other fingers.

Furthermore, as shown in FIG. 3 the first press operation portion 201 for engaging with the forefinger is arranged to have a rotational plane intersecting with the pivotal plane of the brake lever 13. Yet, the first press operation portion 201 and the brake lever 13 are each shaped so that their respective travel paths do not interfere with each other.

In other words, when the second press operation portion 202 is pressed in the counterclockwise direction by the thumb, the first press operation portion 201 is moved beyond the brake lever plane toward the handlebar top face side; however, the first press operation portion 201 does not contact the base end portion of the brake lever 13 even if the brake lever 13 is operated for braking.

Thus, if a braking operation and a speed change operation are made simultaneously, the brake lever 13 and the first press operation portion 201 do not interfere with each other. It is thus possible, for instance, to press the second press operation portion 202 by the thumb while operating the brake lever 13 by the forefinger or middle finger, and using the ring finger and the little finger for gripping the grip portion 4.

As a result, it becomes possible to perform a speed change operation and braking operation while assuredly gripping the handlebar grip portion 4, making possible to perform a braking operation and a speed change operation in response to various running conditions.

Still further, the first press operation portion 201 according to the present embodiment is provided with the extension 203 extending toward the grip portion 4.

The extension 203 can be operated in a radially outward area of the axially inward end of the grip portion 4. Thus, the extension is especially useful for being pressed by the forefinger in the cable paying out direction because the thumb and the other fingers can remain securely gripping the grip portion.

Thus, it is now possible to easily perform a speed change operation in the cable paying out direction by using the forefinger, leading to further improvement in speed change operability.

Still further, in the present embodiment, the speed change operation member 14 is provided with a depressed portion 205 for greatly improving operational feeling while the speed change operation member 14 is held and operated by the thumb and forefinger of the rider with the other fingers gripping the grip portion.

Provision of the depressed portion 205 makes possible to operate the speed change operation member by sliding the anatomical snuffbox along the handlebar grip portion 4 or along a side face of the speed change operation member 14 facing the grip portion. Therefore, even when the speed change operation member must be rotated by a large amount, the rider can virtually keep gripping the grip portion during the speed change operation without loosing control stability, leading to a significant improvement in speed change operability.

Furthermore, in the present embodiment a radially bulging auxiliary extension 204 is formed at an axially intermediate portion of the depressed portion as shown in FIGS. 2 and 3. Provision of this auxiliary extension 204 makes possible to easily operate the speed change operation member 14 in the cable paying out direction by the thumb only.

As has been described, the use of the speed change operation member 14 according to the present embodiment offers a level of speed change operability unexperienced before and therefore, offers comfortable riding.

The scope of the present invention is not limited to the embodiment so far described.

For example, a left speed change operation assembly for activating a front speed shifter may be arranged in the same way as the right speed change operation assembly.

In the embodiment the click ring 33 and the cable winding member 107 are made as separate members and are rotated integrally by the connecting portions 20, 36; however, the click ring 33 and the cable winding member 107 may be made as a one-piece member.

Also in the embodiment, the inner wire t1 of the speed control cable is wound or paid out via the cable winding reel 16 rotated by the drive cable K; however, arrangement may be for the drive reel portion 19 of the cable winding member to wind the inner wire t1 directly.

Further, in the embodiment the click mechanism 32 is used as the retaining mechanism 15 for holding the cable winding member 107 stepwise; however other retaining mechanisms such as one using friction or a ratchet may of course be used.

Still further, the shape of the press operation portions of the speed change operation member 14 may not be limited to the embodiment, and may be changed according to the number of speed steps, the shape of brake lever and other conditions.

Still further, a diametrically opposed pair of engaging pawls 110 is used in the embodiment; however three or more engaging pawls may be provided, or the same function can be expected even with a single engaging pawl.

Finally, in the embodiment the brake bracket 8 is used for forming the fixing member; however, a separate fixing member may be prepared, and additionally, the brake lever may be extended elsewhere than in the embodiment.

We claim:

1. A bicycle speed change operation assembly comprising:

a speed change operation member supported for rotation about an axis of a handlebar between a handlebar grip portion and a fixing member fitted around the handlebar;

a cable winding member supported in the fixing member for rotating about the handlebar axis to wind or pay out a speed control cable;

a retaining mechanism provided within the fixing member for holding the cable winding member at each of predetermined rotational positions; and a transmission mechanism provided between the speed change operation member and the cable winding member for transmitting rotational movement of the speed change operation member to the cable winding member, the transmission mechanism including a transmission ring supported radially inwardly of the speed change operation member for rotation about the handlebar axis together with the cable winding member, the transmission ring having an outer circumference formed with an engaging teeth portion;

an engaging pawl held between the speed change operation member and the transmission ring for slidable movement radially of the transmission ring;

cam means formed internally on the speed change operation member for displacing the engaging pawl radially inward into engagement with the engaging teeth portion of the transmission ring when the speed change operation member is rotated in each of cable winding and paying out directions from a predetermined neutral position; and spring means connected to the engaging pawls for displacing the engaging pawl away from the engaging teeth portion of the transmission ring when the speed change operation member returns toward the predetermined neutral position.

2. The bicycle speed change operation assembly according to claim 1, wherein the cable winding member has an axially outer end provided with an extended portion projecting radially outward between the fixing member and the speed change operation member to define a housing for accommodating the spring means, the extended portion having an outer face which cooperates with an outer face of the fixing member to provide an indicator indicating a speed step.

3. A combination of a brake lever assembly and a speed change operations assembly for a bicycle, the brake lever assembly comprising a fixing member attached to the handlebar, the brake lever assembly further comprising a brake lever pivotally connected to the fixing member for pivotal movement between a non-braking position and a braking position, the speed change operation assembly comprising a speed change operation member supported on the handlebar between the fixing member and a handlebar grip portion for rotation about an axis of the handlebar, wherein the speed change operation member is formed externally with a press operation portion projecting radially outward, and wherein the press operation portion is movable to a position between the speed change operation member and the brake lever without interfering with the brake lever even when the brake lever is pivoted to the braking position.

4. The combination according to claim 3, wherein the speed change operation member is also formed externally with a second press operation portion projecting radially outward and angularly spaced from the first-mentioned press operation portion.

5. The combination according to claim 4, wherein at least one of the first-mentioned and second press operation portions has an extension projecting toward the handlebar grip portion.

6. The combination according to claim 3, wherein the speed change operation member has an outer circumference formed with a depressed portion.

* * * * *